United States Patent [19]
Gardell et al.

[11] Patent Number: 6,031,896
[45] Date of Patent: Feb. 29, 2000

[54] REAL-TIME VOICEMAIL MONITORING AND CALL CONTROL OVER THE INTERNET

[75] Inventors: Steven E. Gardell, North Andover, Mass.; Rahul Chopra, Boca Raton, Fla.; Israel B. Zibman, Newton, Mass.

[73] Assignee: GTE Laboratories Incorporated, Waltham, Mass.

[21] Appl. No.: 09/177,415

[22] Filed: Oct. 23, 1998

[51] Int. Cl.[7] .................................................. H04M 1/64
[52] U.S. Cl. .................... 379/88.17; 379/34; 379/88.15; 379/88.25; 370/352
[58] Field of Search ........................... 379/34, 35, 70, 379/88.15, 88.17, 88.27, 18, 22, 23, 25, 900, 88.25; 370/352

[56] References Cited

U.S. PATENT DOCUMENTS

| | | | |
|---|---|---|---|
| 5,457,735 | 10/1995 | Erickson | 455/450 |
| 5,471,519 | 11/1995 | Howe et al. | 379/88.26 |
| 5,566,236 | 10/1996 | McLampy et al. | 379/201 |
| 5,590,171 | 12/1996 | Howe et al. | 379/33 |
| 5,651,054 | 7/1997 | Dunn et al. | 379/88.11 |
| 5,712,906 | 1/1998 | Grady et al. | 379/93.25 |
| 5,742,596 | 4/1998 | Baratz et al. | 370/356 |
| 5,768,344 | 6/1998 | Kruger et al. | 379/35 |
| 5,768,356 | 6/1998 | McKendry et al. | 379/201 |
| 5,862,208 | 1/1999 | McLampy et al. | 379/212 |

OTHER PUBLICATIONS

Labriola, Don, "Here's Looking at You," Computer Shopper, Sep. 1997, p. 335–362.

*Primary Examiner*—Daniel S. Hunter
*Assistant Examiner*—Roland G. Foster
*Attorney, Agent, or Firm*—Leonard Charles Suchyta

[57] ABSTRACT

A communication system that provides call connections and voice mail service to telephone devices. With this system, a called party has the ability to monitor and control an incoming voice mail message, made by a calling party, which is to be recorded onto a voice mail system. The system includes a switch that connects the incoming calls to the called party and the voice mail system. A voice mail intercept service terminal receives a message to be recorded on the voice mail system and also selectively connects the incoming call to the called party for a two-way communication.

11 Claims, 9 Drawing Sheets

REAL-TIME VOICEMAIL MONITORING AND CALL CONTROL OVER THE INTERNET

RELATED APPLICATIONS FILED CONCURRENTLY HEREWITH

This invention is related to the following inventions, all of which are filed concurrently herewith and assigned to the assignee of the rights in the present invention: Ser. No. 06/105,326 of Gardell et al. entitled "A HIGH SPEED COMMUNICATIONS SYSTEM OPERATING OVER A COMPUTER NETWORK"; Ser. No. 09/177,712 of Gardell et al. entitled "MULTI-LINE TELEPHONY VIA NETWORK GATEWAYS"; Ser. No. 09/178,130 of Gardell et al. entitled "NETWORK PRESENCE FOR A COMMUNICATIONS SYSTEM OPERATING OVER A COMPUTER NETWORK"; Ser. No. 09/178,271 of Gardell et al. entitled "SPEAKER IDENTIFIER FOR MULTI-PARTY CONFERENCE"; Ser. No. 09/178,178 of Gardell et al. entitled "SYSTEM PROVIDING INTEGRATED SERVICES OVER A COMPUTER NETWORK"; Ser. No. 09/177,700 of Gardell et al. entitled "MULTI-LINE APPEARANCE TELEPHONY VIA A COMPUTER NETWORK".

FIELD OF THE INVENTION

The present invention generally relates to the field of telecommunications. More specifically, the present invention concerns a method and apparatus for controlling and monitoring a voicemail system.

BACKGROUND OF THE INVENTION

Communication systems for saving and retrieving telephone messages have become an integral, indispensable part of everyday life. The ability to have an automated system answer telephone calls and take a message have permeated society. Answering machines were the first units widely used for telephone message recording and retrieving. These systems provided either a cassette tape recording or a digital recording of the telephone message. With these systems, a recipient of a message could listen to the message as it was being recorded. During the course of the recording, the recipient could override the recording device and gain control of the call by lifting the receiver and answering the call. The recipient of the call could also simply turn off the machine and lift the receiver and answer the call, which would in turn disable the recording device and allow the user to regain control of the telephone call. No message would be recorded.

The next evolution was the automated voice mail system employed by many offices. This system does not require an answering machine for each person, office or even telephone number. Instead an internal telephonic network renders the use of separate answering machines unnecessary. When a telephone call is routed to the recording device, the sound of the message itself is not heard by the recipient, instead the internal system records the call without giving the user the ability to monitor the message being recorded. In addition, complete control over the call is transferred to the automated voice mail system. The user is completely removed from the decision making process regarding the call in that the user is unable to gain control of the incoming call.

Therefore, one of the major drawbacks that exists with presently available automated voice mail systems is the inability to monitor a call and allow the user to obtain control of the telephone call.

Another major drawback that exists with present systems is the limited access to and control of incoming calls while the called party is on the same line connected to some on-line service, such as the Internet. Presently, when a user is on-line, there is no means available for the user to monitor the incoming call.

Consequently, there exists a need wherein a called party has the capability of listening to a telephone call while the calling party is recording a message on a voice mail system and the called party also has the capability of controlling the telephone call. There is also a need to be able to listen to a message being recorded and control the telephone call while the called party is on the same line connected to the Internet or other on-line services.

SUMMARY OF THE INVENTION

These needs and others are met with a real-time voice mail monitoring and call control system. A real-time voice mail monitoring and call control system allows a listener (the called party) to monitor a caller's (the calling party's) live voice mail message. The called party can also connect to the calling party at any time during the reception of the voice mail message. When the called party connects to the calling party, control of the call is transferred from the voice mail system to the called party. Accordingly, the recorded portion of the message is then deleted from the voice mail system.

Oftentimes, when a call is placed to the called party their telephone line may be busy because they are using the same line, for example, to contact an on-line system, such as the Internet. The live voice mail monitoring and call control system allows the called party to monitor a caller's live voice mail message while maintaining the connection to the on-line system. The called party can also decide to connect to the caller during the recording of the voice mail message. Accordingly, if the called party decides to connect to the calling party, the recorded portion of the message is removed from the voice mail system.

BRIEF DESCRIPTION OF THE DRAWINGS

The foregoing and other features and advantages of the present live voice mail monitoring and call control system and method are readily apparent and are to be understood by referring to the following detailed description of the preferred embodiment of the present invention, taken in conjunction with the accompanying drawings, in which.

DETAILED DESCRIPTION OF THE PREFERRED EMBODIMENT

The H.323 standard is an International Telecommunications Union (ITU) standard for packet-based voice and video communication, which supports both voice and video communication over the Internet. ITU Recommendation H.323 describes the operation of terminals and equipment that provide multimedia communications services over packet based networks (PBN) which may not provide a guaranteed Quality of Service (QoS), for example, for audio applications. H.323 terminals and equipment may carry real-time audio, video and/or data. Support for audio is mandatory, while data and video are optional. However, if supported, the ability to use a specified common mode of operation is required, so that all terminals supporting that media type can work in conjunction with each other.

The packet based network over which H.323 terminals communicate, may be a point-to-point connection, a single network segment, or an inter-network having multiple segments with complex topologies.

Figure 1:
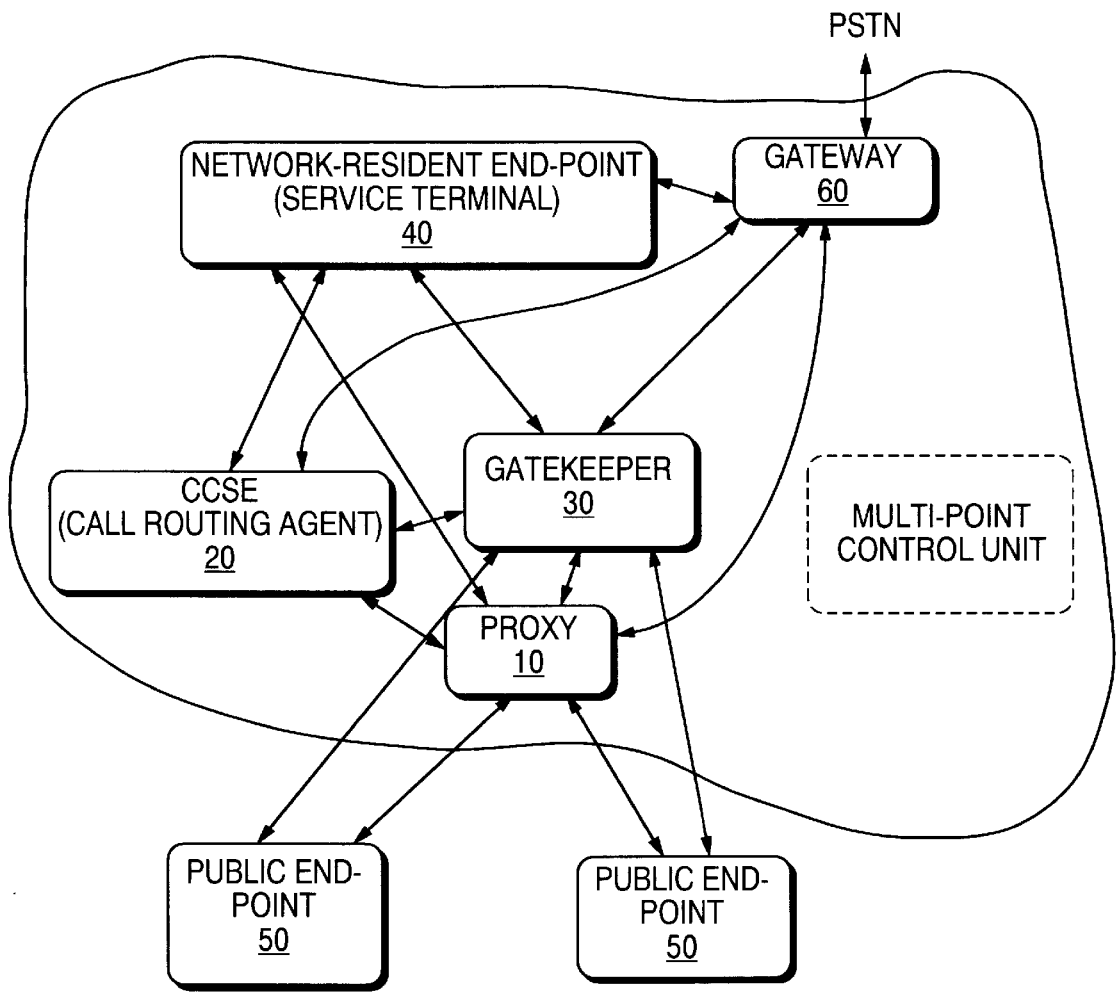
FIG. 1 is a block diagram of an H.323 network.

FIG. 1 is an overview of a possible configuration of an H.323 network such as that described in U.S. patent application Ser. No. 60/105,326 of Gardell et al. filed concurrently herewith and entitled "A High Speed Communication System Operating Over A Computer Network." This concurrently filed application is incorporated herein by reference. The elements included in this particular network are: Proxy 10, Call Control Service Entity (CCSE) 20, Gatekeeper 30, Service Terminal 40, Public Endpoints 50, and Gateway 60. Proxy 10 is an H.323 component which has the important role of controlling access to the Quality of Service network (QoS). The Proxy 10 also provides traffic engineering and a security function. In this regard, the Proxy 10 routes H.323 signals between two end-points.

Call Control Service Entity (CCSE) 20 is a H.323 entity that routes H.323 call control signals. The role of the CCSE 20 is to provide the initial connection between an incoming call and the intended public end-point(s). The CCSE 20 is able to respond to call control events that occur during the course of this initial call placement and redirect the call path according to a subscriber's (called party's) service path. Gatekeeper 30 plays a central role in this infrastructure. Specifically, it directs calls to the CCSE 20. Without the Gatekeeper 30, there would be no mechanism for initiating the communications between a public end-point such as a calling party and the CCSE 20.

Service Terminal 40 is an entity that "lives in the network" and behaves like an H.323 terminal. In effect, the Service Terminal 40 acts as a surrogate for a live terminal. The Service Terminal 40 provides a place for actual services to be rendered to the caller on behalf of the called party. For example, a voice mail system would be implemented as a service terminal.

Public End-Point 50 may be any H.323 terminal, Gateway or Multipoint Control Unit. An endpoint can call and be called, and can also generate and/or terminate information streams. A Multipoint Control Unit (MCU) is an endpoint which provides the capability for three or more terminals/gateways to participate in a multipoint conference. Of course, this unit may also connect two terminals which may later develop into a multipoint conference. An example of such conference capability is described in U.S. patent application Ser. No. 09/178,271 of Gardell et al. filed concurrently herewith and entitled "Speaker Identifier for Multi-Party Conference." This application is incorporated herein by reference.

Gateway 60 is an H.323 gateway that provides for signaling conversions between a Public Switched Telephone Network (PSTN) and an H.323 network environment. The Gateway 60 is able to accept a call originating in the PSTN and pass it on to the H.323 network or vice-versa. The Gateway 60 is responsible for passing caller-ID, number-dialed, and other information in both directions.

Figure 2:
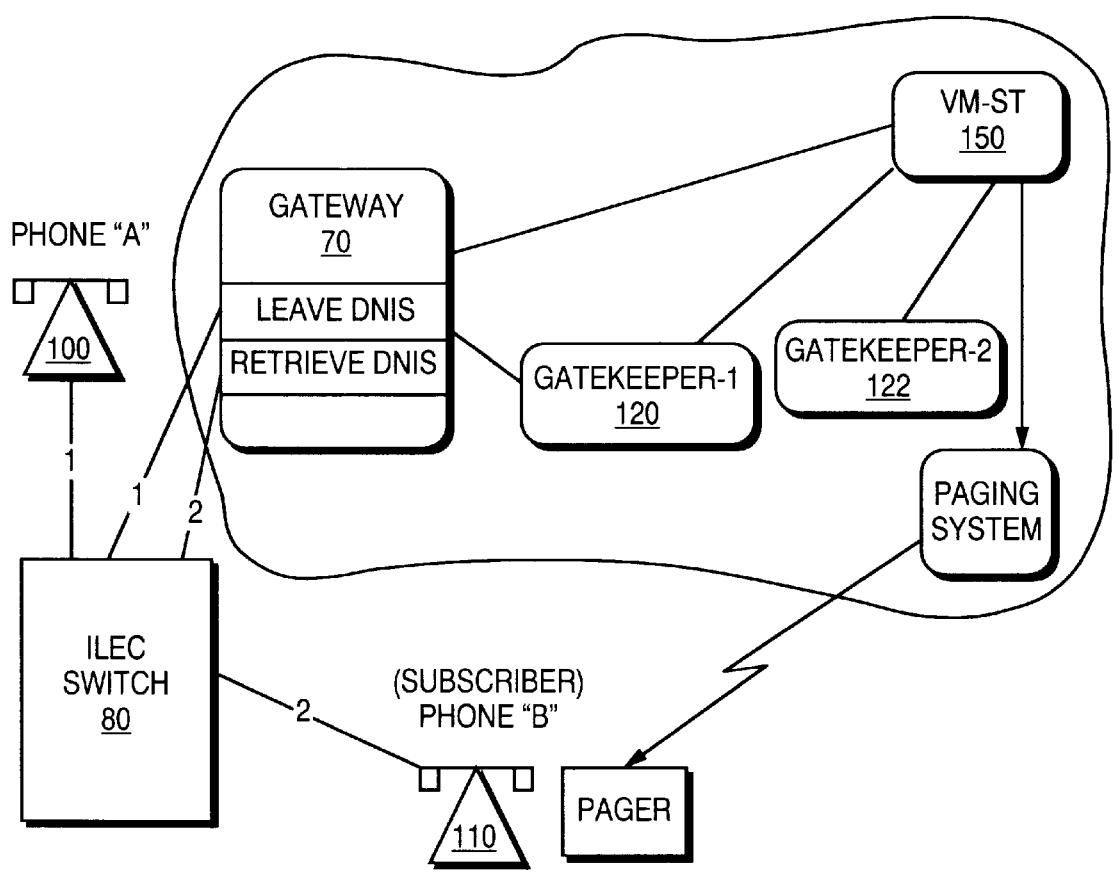
FIG. 2 is a block diagram of a centralized voice mail system according to the present invention.
Figure 3A:
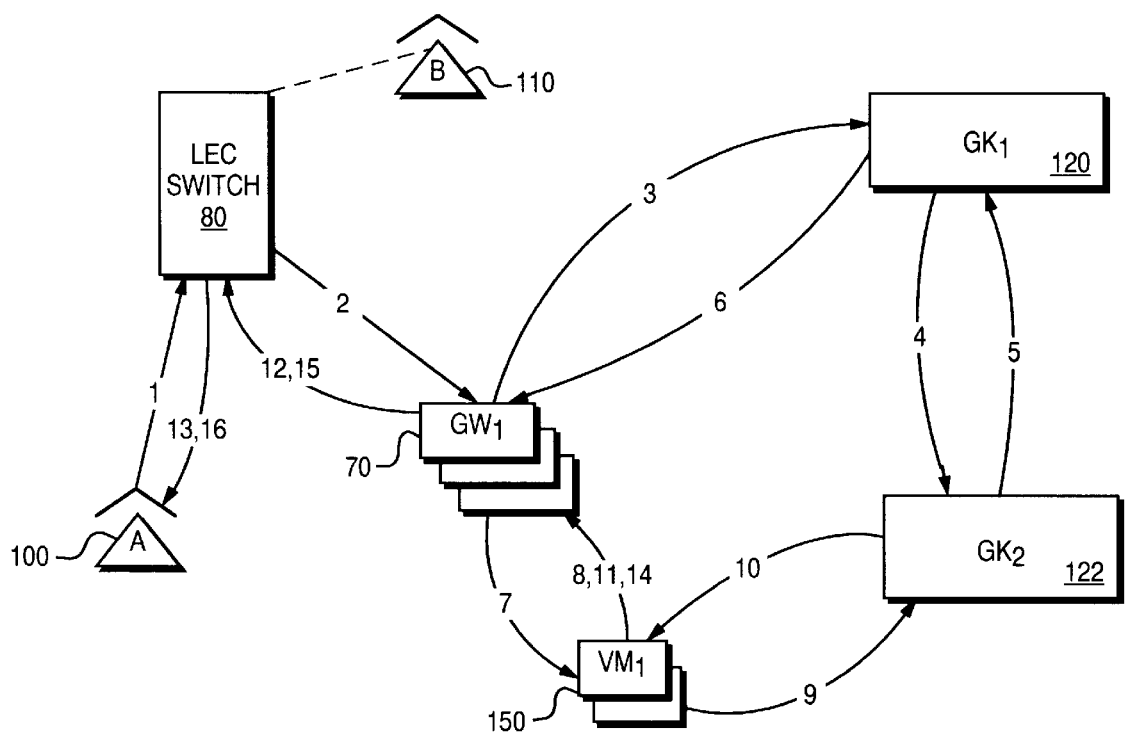
FIG. 3a is a chart illustrating the message flow for the recording of a voice mail message.
Figure 3B:
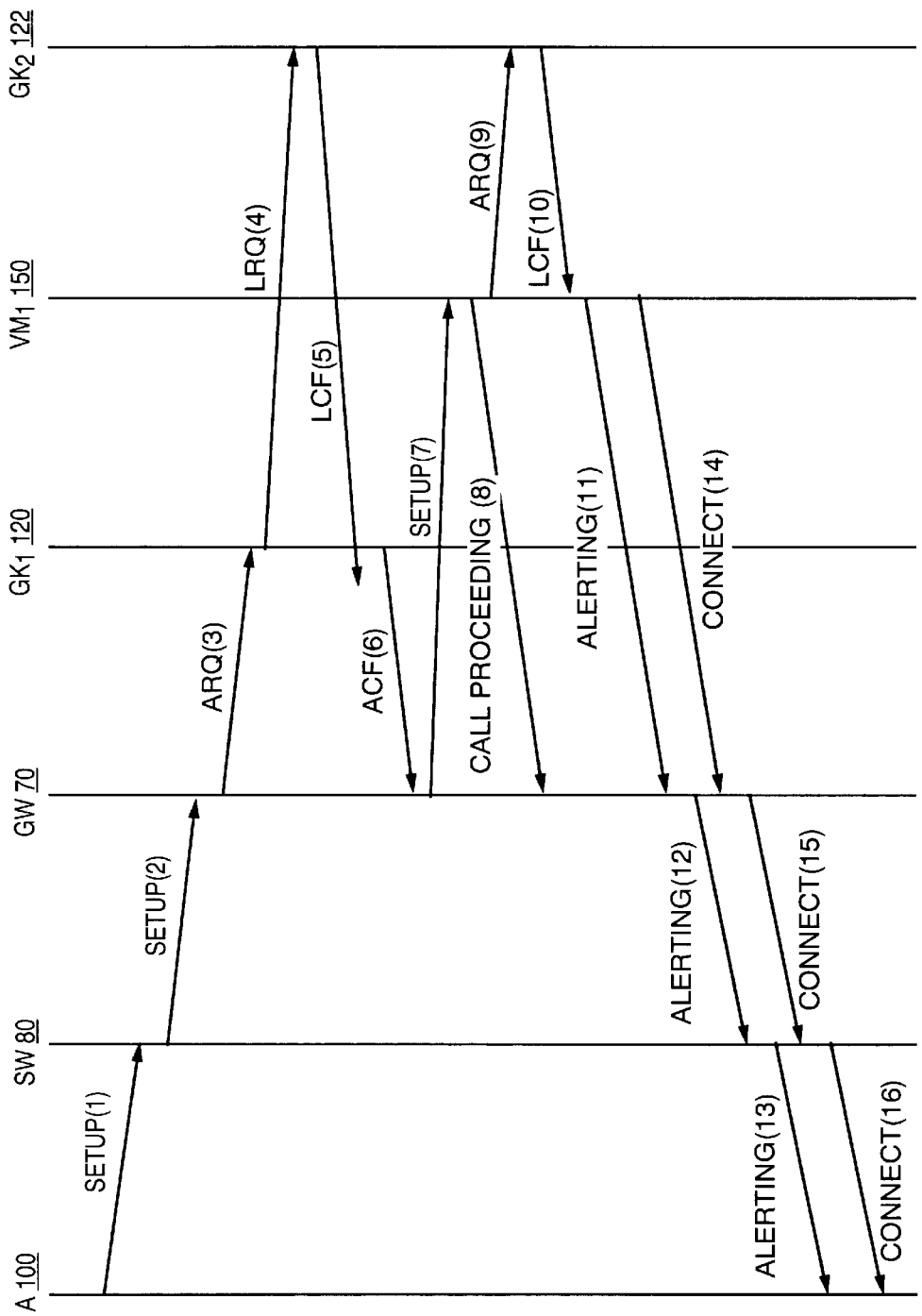
FIG. 3b is a timing diagram for the recording of a voice mail message.

The voice mail system contemplated in the present invention is a centralized voice mail service. The centralized voice mail architecture is shown in FIG. 2. The Gateway 70 interacts with a Local Exchange Carrier (LEC) switch 80 as if it were an actual messaging platform. The LEC switch can also be an Internet telephone switch such as an Internet Local Exchange Carrier (ILEC) or an Internet Exchange Carrier (IEC) switch. It should be noted that the phone B 110 shown in FIG. 2 is an IP phone (a.k.a. Internet Phone). Therefore, even though phone A 100 can be a regular phone in this invention, phone B 110 is an IP phone. Furthermore, the IP phone needs additional software wherein the software would essentially allow for the execution, in one embodiment of the invention, of the steps 1–44 as shown in the timing diagram of FIG. 6b. There are two voice mail system service scenarios: recording voice messages and playing back voice messages. FIGS. 3a and 3b illustrate the basic flow for the recording of a message. More specifically, FIG. 3a illustrates what happens when a calling party calls a called party and decides to record a message, since the calling party cannot connect to the called party. FIG. 3b shows the timing diagram associated with FIG. 3a.

In Step (1) of the process, a calling party at a first telephone device (Endpoint A) 100 attempts to contact the called party at a second telephone device (Endpoint B) 110 (FIGS. 2, 3a and 3b). The LEC Switch 80 is configured to forward calls placed to the second telephone device 110 to a specific port on the Gateway 70 under certain situations such as "busy" or "no answer" (step (2)). The Gateway 70 or GW then sends an Admission Request (ARQ) to a first Gatekeeper 120 or GK, in step (3) to gain permission for the call and to recover a call signaling address to be located. A Location Request (LRQ) with this address is then sent to a second Gatekeeper 122 or GK, in step (4) to determine an address for a Voice Mail Service Terminal 150 or VM.

Upon determining that the called telephone device is available for connection through the second Gatekeeper 122, the second Gatekeeper 122 generates a location confirmation (LCF) signal, which is sent to the first Gatekeeper 120 in step (5). The LCF (5) signal may also include the address of the second Gatekeeper 122 for use in routing the call.

In response to the LCF (5) signal, the first Gatekeeper 120 generates an admission confirmation (ACF) signal which is sent to the Gateway 70 in step (6), which in turn transmits the SETUP (7) signal to the Voice Mail Service Terminal 150 in step (7) to control the initial connection procedures between the first and second telephone devices 100 and 110.

The Voice Mail Service Terminal 150 then generates a CALLPROCEEDING (8) status signal, which is sent to the Gateway 70 in step 8 to indicate that the call connection is being initially established. The Voice Mail Service Terminal 150 also transmits an ARQ (9) signal to the second Gatekeeper 122 in step 9 to request permission to connect the telephone devices 100 and 110. The second Gatekeeper 122 in turn determines whether a connection may be made. If a connection may be made, the second Gatekeeper 122 generates an ACF (10) signal which is transmitted to the Voice Mail Service Terminal 150 in step 10.

The Voice Mail Service Terminal 150 then sends an ALERTING (11) signal to the Gateway 70 in step (11). This ALERTING (11) signal allows for the initialization of the appropriate connection protocols for connecting the call. Once the Gateway 70 receives this ALERTING (11) signal, the Gateway 70 then transmits an ALERTING (12) signal to the first telephone device (Endpoint A) 100. This ALERT signal is transmitted as ALERTING (12) signal from the Gateway 70 to the LEC Switch 80 (step 12) and finally as ALERTING (13) signal from Switch 80 to the first telephone device 100 (step 13). The first telephone device 100 responds to the ALERT signal by initializing appropriate connection protocols for connecting the call.

A CONNECT (14) signal is then transmitted from the Voice Mail Service Terminal 150 to the Gateway 70 in step 14. A CONNECT (15) signal is also transmitted to the LEC Switch 80 (step 15) and finally from Switch 80 a CONNECT (16) signal is sent to the first telephone device 100 (step 16). The first telephone device 100 responds to the CONNECT signal by performing the appropriate connection protocols for connecting the call. Thereafter, the call connection between the Voice Mail Service Terminal 150 and the first telephone device (Endpoint A) 100 is established. At this point, the calling party is connected to the Voice Mail Service Terminal 150 and can, leave a message for the called party.

Figure 4A:
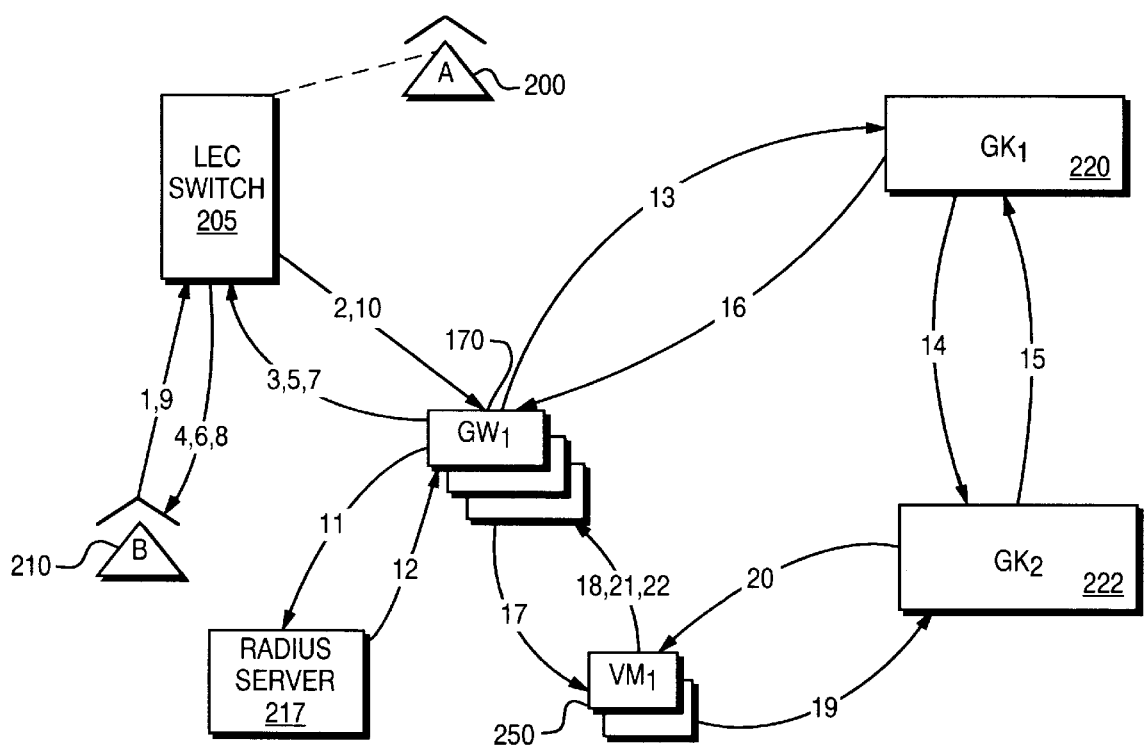
FIG. 4a is a chart illustrating the message flow for the play back of a voice mail message.
Figure 4B:
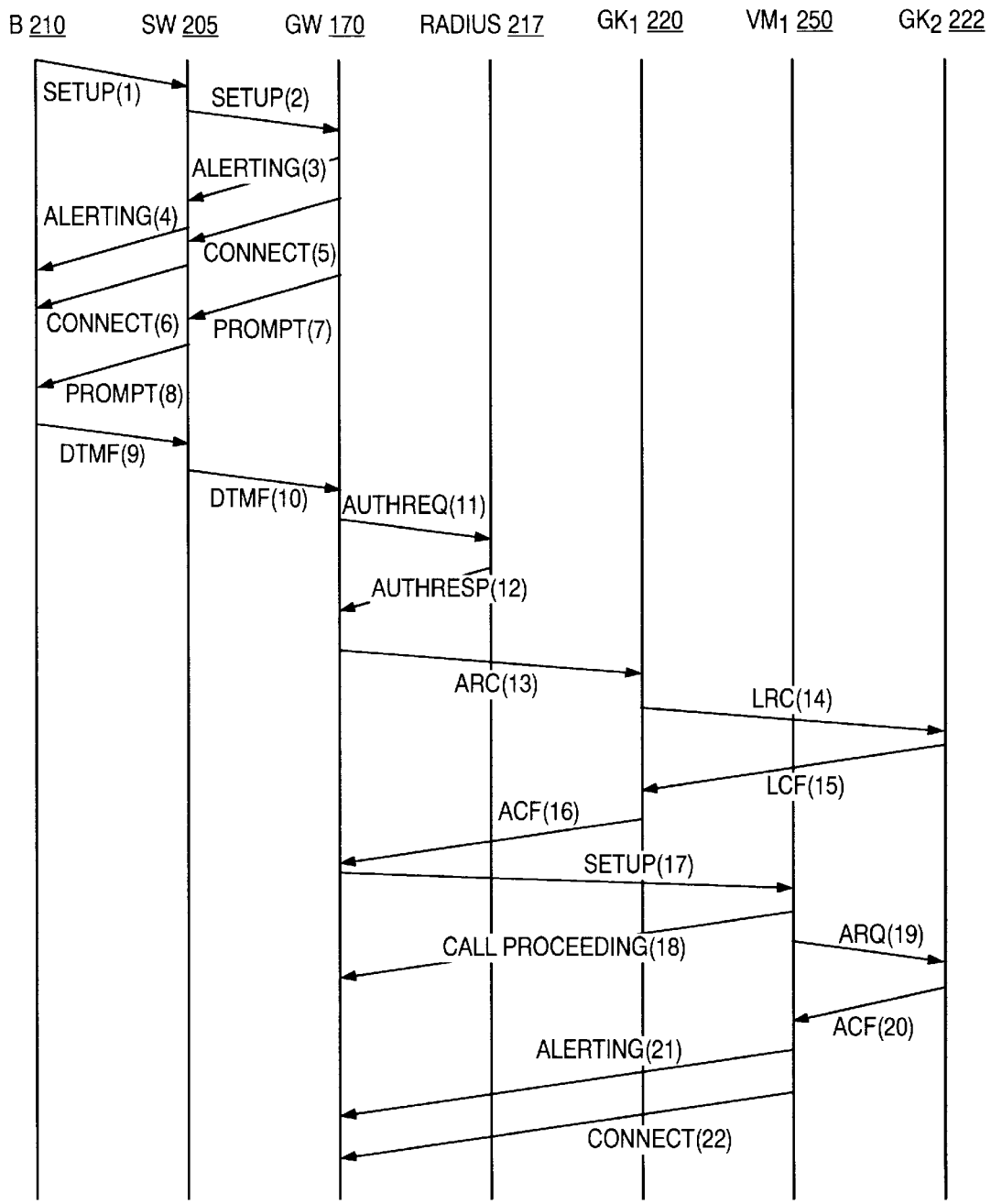
FIG. 4b is a timing diagram for the playback of a voicemail message.

FIGS. 4a and 4b illustrate the playback of a voice mail message. More specifically, FIG. 4a illustrates what happens when a subscriber decides to playback messages that have been recorded onto the voice mail system. FIG. 4b shows the timing diagram associated with FIG. 4a. In step (1) of the process, a subscriber (called party) using a telephone device (Endpoint B) 210 attempts to retrieve their voice mail messages. The telephone device 210 issues a SETUP (1) signal in step 1 to an LEC Switch 205, which in turn routes a SETUP (2) signal to a Gateway 170 in step 2. The SETUP signal is generated by the telephone device 210 to establish a connection to the Gateway 170. In response to the SETUP signal, the Gateway 170 generates an ALERT signal, which is sent to the telephone device (Endpoint B) 210 as signals ALERTING (3) and ALERTING (4) in steps 3 and 4 via the LEC switch 205. This ALERT signal allows for the initialization of the appropriate connection protocols for connecting the Gateway 170 to the telephone device (Endpoint B) 210. Thereafter, the Gateway 170 connects to the telephone device 210 by sending CONNECT signals (CONNECT (5) and CONNECT (6)) in steps 5 and 6, again via the LEC switch 205.

Once the connection between the Gateway 170 and the telephone device 210 is established, the Gateway 170 transmits PROMPT signals (PROMPT (7) and PROMPT (8)) to the telephone device 210 via the LEC switch 205 (steps 7 and 8). The PROMPT signal prompts the subscriber at the telephone device 210 to enter a password, or the like, to access the subscriber's voice mail messages.

In response, the subscriber at the telephone device 210 enters a password by some means, such as pressing keys on the telephone device 210 or by vocalizing commands into the telephone device 210. This password is transmitted, e.g., as a Dual-Tone Multifrequency (DTMF) signals (DTMF (9) and DTMF (10)) from the telephone device 210 to the Gateway 170 in steps 9 and 10.

Once the Gateway 170 receives the password, the Gateway 170 transmits a AUTHREQ (11) signal to a Radius Server 217 in step 11. The Radius Server 217 authenticates the subscriber by checking the password and sending an AUTHRESP (12) signal to the Gateway 170 in step 12 if the password is properly authenticated. The Gateway 170 responds by sending an ARQ (13) signal to the first Gatekeeper 220 in step 13 to obtain permission for the call. In response, the first Gatekeeper 220 generates a location request LRQ (14) signal to be sent to the second Gatekeeper 222 in step 14 to determine the call signaling address for the Voice Mail Service Terminal 250. Alternatively, the password may be sent to the Voice Mail Service Terminal 250 which, in turn, can authenticate the subscriber.

Upon determining the address of the Voice Mail Service Terminal 250, the second Gatekeeper 222 generates a location confirmation signal LCF (15), which is sent to the first Gatekeeper 220 in step 15.

In response to the LCF (15) signal, the first Gatekeeper 220 generates an admission confirmation signal ACF (16) which is sent to the Gateway 170 in step 16. The Gateway 170, in turn, transmits the SETUP (17) signal to the Voice Mail Service Terminal 250 in step 17 to control the initial connection procedures between the telephone device 210 and the Voice Mail Service Terminal 250.

The Voice Mail Service Terminal 250 then generates a CALLPROCEEDING (18) status signal, which is sent to the Gateway 170 in step 18 to indicate that the call connection is being established. The Voice Mail Service Terminal 250 also transmits an ARQ (19) signal to the second Gatekeeper 222 in step 19 to request permission to connect the Gateway 170 to the Voice Mail Service Terminal 250. The second Gatekeeper 222 in turn determines whether a connection may be made. If a connection may be made, the second Gatekeeper 222 generates an ACF (20) signal, an admission confirmation, which is transmitted to the Voice Mail Service Terminal 250 in step 20.

In response to the ACF (20) signal from the second Gatekeeper 222, the Voice Mail Service Terminal 250 transmits ALERTING (21) signals to the Gateway 170 in step 21. These ALERTING (21) signals allow for the initialization of the appropriate connection protocols for connecting the call. Once the Gateway 170 receives this ALERTING (21) signal, it responds by initiating appropriate connection protocols for the connection of the subscriber and the Voice Mail Service Terminal 250 through the Gateway 170.

A CONNECT (22) signal is then transmitted from the Voice Mail Service Terminal 250 to the Gateway 210 in step 22. The Gateway 210 responds to the CONNECT (22) signal by performing the appropriate connection protocols in order to connect the call. Thereafter, the call connection between the Voice Mail Service Terminal 250 and Gateway 210 is established. At this point, the subscriber at telephone device 200, who was already connected to the Gateway 170 by way of steps 1 through 6, is now connected to the Voice Mail Service Terminal 250 via the Gateway 170. Accordingly, the subscriber has the capability of accessing and listening to messages from the Voice Mail Service Terminal 250.

Figure 5:
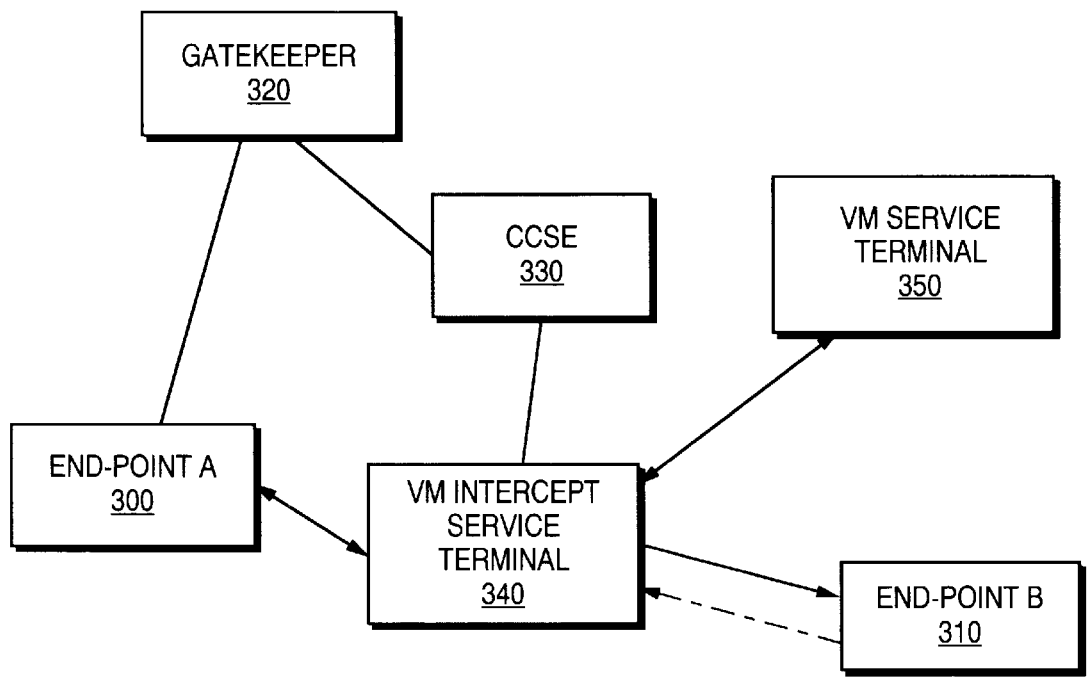
FIG. 5 is a block diagram of the real-time voice mail monitoring and call control system according to the present invention.

Referring now to FIG. 5, there is shown an overview of the major components of an exemplary configuration for the real-time voice mail monitoring and call control system of the present invention.

The system allows a listener to monitor a calling party's live voicemail message. If and when the called party decides to connect to the calling party, control of the call is transferred from the voicemail system to the listener.

In use, Endpoint A 300 transmits a call-signal to the Gatekeeper 320. The Gatekeeper 320, is responsible for address translation, the managing of the bandwidth and potentially for the routing of call control signals. For example, given an alias, such as a phone number, the Gatekeeper 320 will locate the associated address. The Gatekeeper 320 then directs the call to the CCSE (Call Control Service Entity) 330. Thus, the Gatekeeper plays a central role in the infrastructure. Without the Gatekeeper 320, there would be no mechanism in the standard for initiating the communication between the public Endpoint A 300 and the CCSE 330.

The CCSE 330 is an H.323 entity that routes H.323 call control signals. Generally, its role is to provide the initial connection between an incoming call and the intended public endpoint, such as Endpoint B 310. The CCSE 330 is able to respond to call control events that occur during the course of this initial call placement and redirect the call path according to a subscriber's service profile. In operation, the CCSE 330 first routes the call to the Voice Mail Intercept Service Terminal (VMIST) 340 on behalf of a particular subscriber. For example, the subscriber may desire to have all calls forwarded to the voicemail system when the subscriber is unavailable to take the call, is on another call on the same line, or is using the line for some on-line service, such as the Internet. This Voice Mail Intercept Service Terminal 340 acts as an H.323 Multipoint Control Unit (MCU). Essentially, the Voice Mail Intercept Service Terminal 340 creates a three-party call among Endpoint A, Endpoint B and the Voice Mail Service Terminal 350 where one of the media paths is unidirectional. If the user at Endpoint B 310 should elect to take the call after listening for a while, a bi-directional path between the Voice Mail Intercept Service Terminal 340 and the Endpoint B 310 is created while the connection between the Voice Mail Intercept Service Terminal 340 and the Voice Mail platform 350 is dropped.

Figure 6A:
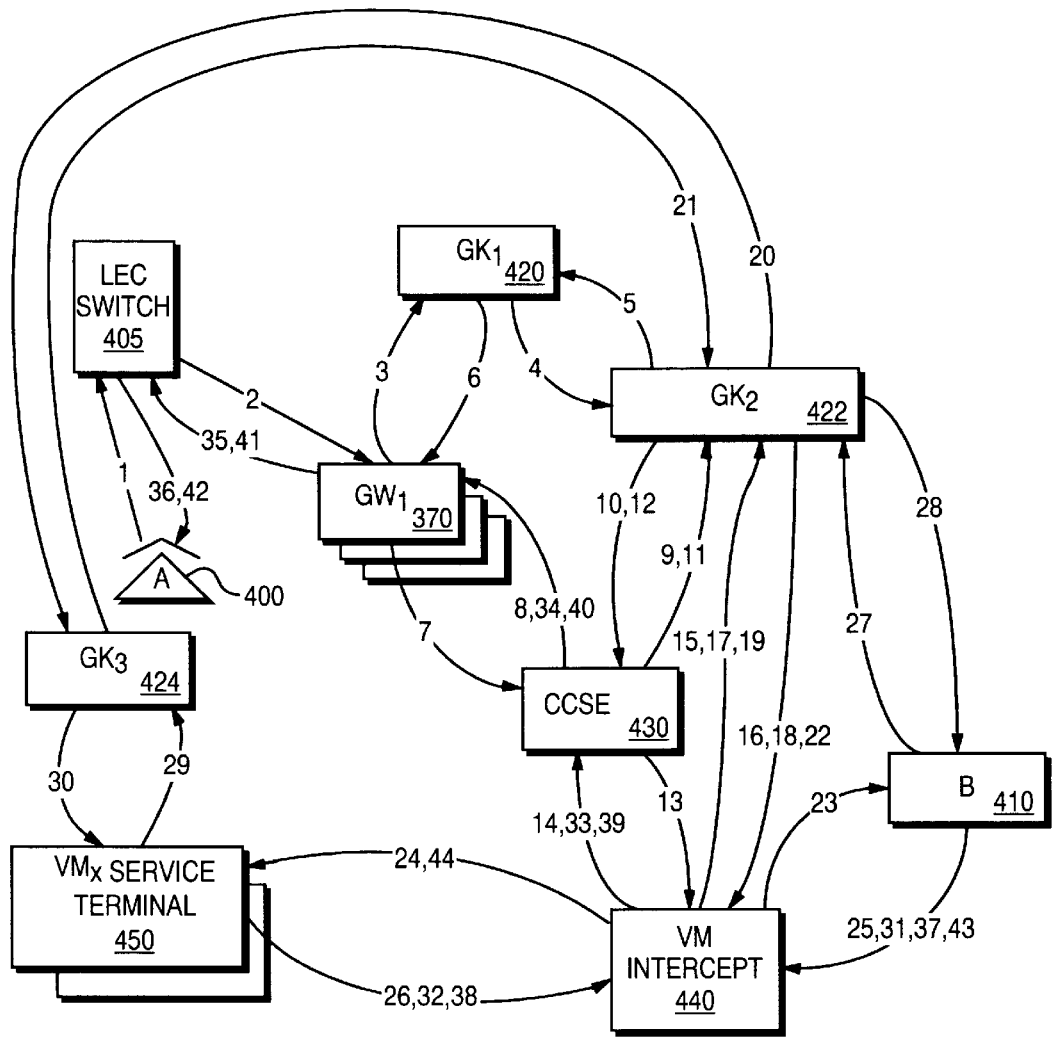
FIG. 6a is a chart illustrating message flow in real-time for the real-time voice mail monitoring and call control system of FIG. 5.
Figure 6B:
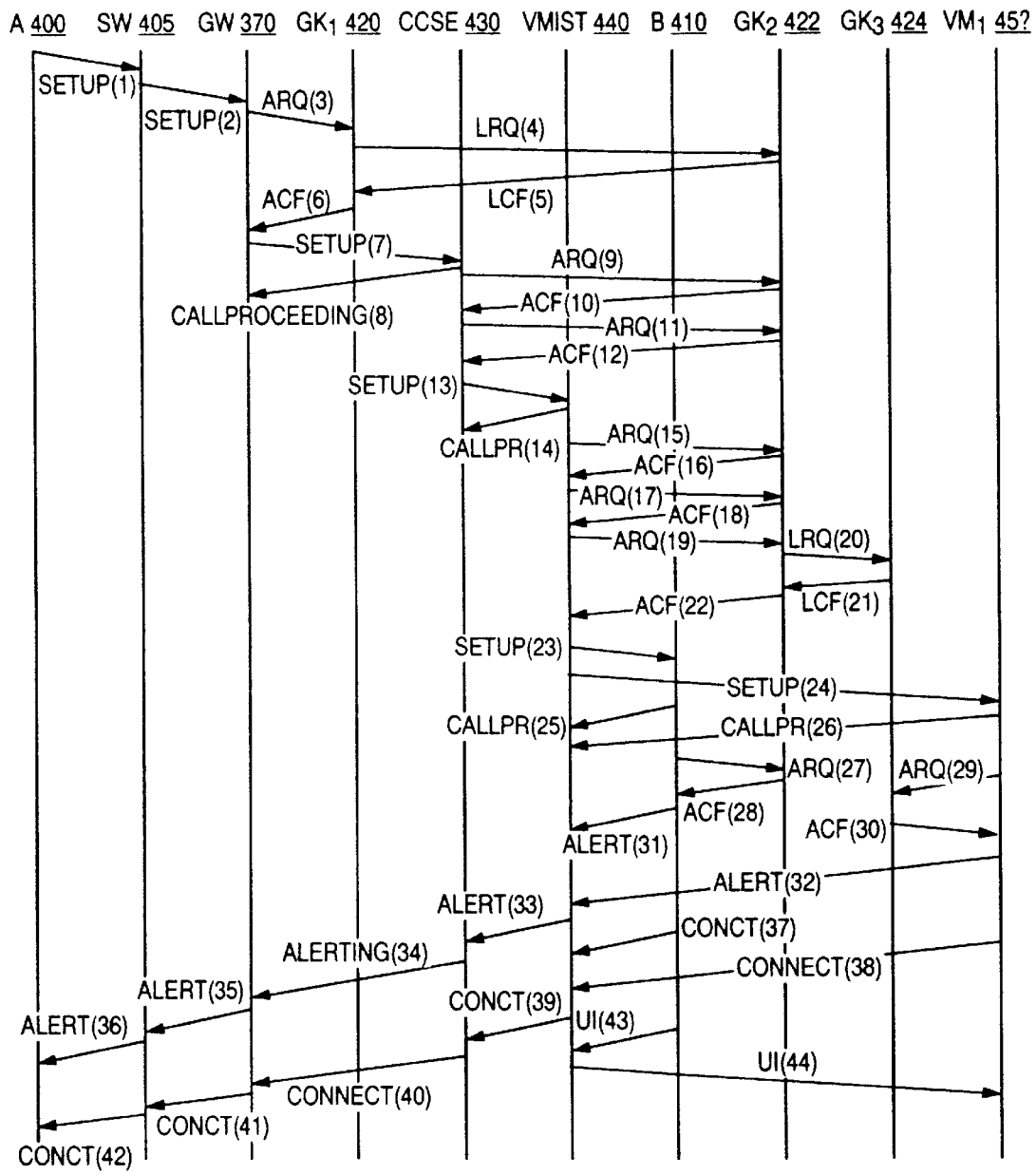
FIG. 6b is a timing diagram for the real-time voice mail monitoring and call control system of FIG. 5.

FIGS. 6a and 6b show more detailed signaling steps carried out by the preferred embodiment. In particular, FIG. 6a illustrates how a called party can monitor a message being recorded onto the voicemail system, while retaining the option to take control of the call being recorded. FIG. 6b shows the timing diagram associated with FIG. 6a. Referring to FIGS. 6a and 6b, the first telephone device Endpoint A (400), issues a SETUP (1) signal in step 1 to an LEC Switch 405, which in turn routes the SETUP (2) signal to the Gateway 370 in step 2. The SETUP (1) signal is generated by the first telephone device, Endpoint A (400), to establish a connection to the second telephone device 410, Endpoint B. In response to the SETUP signals, the Gateway 370 generates an admission request signal ARQ (3), which is sent to the first Gatekeeper 420 in step 3.

In response, the first Gatekeeper 420 generates a location request signal LRQ (4) which is sent to the second Gatekeeper 422 in step 4 to determine the address for the second telephone device (Endpoint B) 410 and whether the second telephone device 410 is available for connection. Upon determining that the second telephone device 410 is available for connection through the second Gatekeeper 422, the second Gatekeeper 422 generates a location confirmation signal LCF (5), which is sent to the first Gatekeeper 420 in step 5. The LCF (5) signal may also include the address of the second Gatekeeper 422 for use in routing the call there through.

In response to the LCF (5) signal, the first Gatekeeper 420 generates an admission confirmation signal ACF (6) which is sent to the Gateway 370 in step 6, which in turn transmits the SETUP (7) signal to the CCSE 430 in step 7 to control the initial connection procedures between the first and second telephone devices 400 and 410.

The CCSE 430 then generates a CALLPROCEEDING (8) status signal, which is sent to the Gateway 370 in step 8 to indicate that the call connection is being established. The CCSE 430 also transmits an ARQ (9) signal to the second Gatekeeper 422 in step 9 to request permission to connect the two telephone devices 400 and 410. The second Gatekeeper 422 in turn determines whether a connection may be made. If a connection may be made, the second Gatekeeper 422 generates an ACF (10) signal which is transmitted to the CCSE 430 in step 10.

In response to the ACF (10) signal from the second Gatekeeper 422, the CCSE 430 transmits the SETUP (13) signal to the Voice Mail Intercept Service Terminal (VMIST) 440 in step 13, which in turn transmits a CALL-PROCEEDING (14) (CallPr) signal to the CCSE 430 in step 14 to indicate that the call connection is being established.

Also, the VMIST 440 generates an ARQ (15) signal and transmits it to the second Gatekeeper 422 in step 15 to obtain permission to establish the call with the second telephone device 410. After receiving an ACF (16) signal from the second Gatekeeper 422 (step 16), the VMIST 440 then generates an ARQ (17) signal and transmits it to the second Gatekeeper 422 (step 17). Thereafter, the second Gatekeeper 422 transmits an ACF (18) signal to the VMIST 440. The VMIST 440 responds by generating a third ARQ (19) signal (step 19). At least 3 ARQs are necessary because the VMIST must manage at least 3 connections or legs, i.e. the connections between Endpoint A 400 and the VMIST 440, between Endpoint B 410 and the VMIST 440, and between the Voice Mail Service Terminal 450 and the VMIST 440. The second Gatekeeper 422 then generates an LRQ (20) signal to the third Gatekeeper 424 in step 20. The third Gatekeeper 424 in turn generates an LCF (21) signal and transmits this signal to the second Gatekeeper 422 in step 21 in order to confirm the location. The second Gatekeeper 422 then sends an ACF (22) signal to VMIST 440 in step 22 to confirm the admission.

Once the VMIST 440 receives the ACF (22) confirmation, the VMIST 440 transmits the SETUP (23) signal to the second telephone device (Endpoint B) 410 (step 23) and the SETUP (24) signal to the Voice Mail Service Terminal 450 (step 24). Accordingly, Endpoint B 410 and the Voice Mail Service Terminal 450 transmit CALLPROCEEDING (CallPr) (25) signal and CallPr (26) signal to the VMIST 440 (Steps 25 and 26). This signal initially establishes a call connection between the Endpoint B 410 and the VMIST 440 and also between the Voice Mail Service Terminal 450 and the VMIST 440. Endpoint B 410 and the Voice Mail Service Terminal 450 transmit ARQ (27) signal to Gatekeeper 422 and ARQ (29) signal to Gatekeeper 424 respectively. They receive ACF (28) signals and ACF (30) from the first and second Gatekeepers 422 and 424 respectively (Steps 27–30). Both Endpoint B 410 and the Voice Mail Service Terminal 450 then send ALERT (31) and ALERT (32) signals to the VMIST 440 in steps 31 and 32. These ALERT signals allow for the initialization of the appropriate connection protocols connecting the call. Once the VMIST 440 receives the ALERT signals, the VMIST 440 then transmits an ALERT signal to Endpoint A 400 in step 33–36. This ALERT signal is transmitted through the CCSE 430, through the Gateway 370 (Step 34), through the LEC Switch 405 (Step 35) and finally to the first telephone device (Endpoint A) 400 (Step 36). The first telephone device 400 responds to the ALERT signal by initializing appropriate connection protocols for connecting the call.

The CONNECT (38) signal and CONNECT (37) signal are then transmitted from the Voice Mail Service Terminal 450 and Endpoint B 410 respectively, to the VMIST 440 in steps 37 and 38. The CONNECT signal is also transmitted through the CCSE 430 (Step 39), through the Gateway 370 (Step 40), and through the LEC Switch 405 (Steps 41 and 42), and thence to the first telephone device Endpoint A 400. The first telephone device 400 responds to the CONNECT (42) signal by performing the appropriate connection protocols for connecting the call. Thereafter, a call connection among the Voice Mail Service Terminal 450, Endpoint B 410 and Endpoint A 400 is established. At this point, the subscriber (called party) at Endpoint B 410 is connected to the calling party at Endpoint A 400 and the Voice Mail Service Terminal 450. Thus the subscriber can monitor the voice message which is being recorded.

If the subscriber (called party) located at the second telephone device (Endpoint B) 410 determines that they would like to, at some point prior to the end of the message, actively participate by speaking to the calling party located at Endpoint A 400, the subscriber transmits a take-over signal to the VMIST (Voice Mail Intercept Service Terminal). This signal issued to the VMIST 440 instructs the VMIST 440 to drop the connection to the Voice Mail Service Terminal 450 and allow information to flow from Endpoint B 410 where the subscriber is located to Endpoint A 400 where the calling party is located. Again referring to FIGS. 6a and 6b, the aforementioned process is shown by steps 43 and 44. Specifically, a signal UI (43) is transmitted from the Endpoint B 410 to the VMIST 440 as shown by step 43. This signal instructs the VMIST 440 to terminate the connection to the Voice Mail Service Terminal 450. The VMIST 440 then sends a message UL (44) which informs the Voice Mail Service Terminal 450 to terminate the call and delete the partial message as shown by step 44. Of course, the message can also be reset and recorded over rather than actually erased.

Accordingly, the subscriber has the capability to listen to a message as it is being recorded and has the option of terminating the recording of the message and connecting to the calling party.

While the disclosed real-time voice mail monitoring and call control system and method is particularly shown and described herein with reference to the preferred embodiments, it is to be understood that various modifications in form and detail may be made therein without departing from the spirit and scope of the present invention. Accordingly, modifications, such as any examples suggested herein, but not limited thereto, are to be considered within the scope of the present invention.

The following is claimed:

1. A communication system for providing call connections and voice mail service to a network-based telephone device, the communication system comprising:

an internet telephone switch that selectively connects an incoming call to at least one end point including a called party having an internet telephone and a gateway for processing calls from a public switched telephone network (PSTN) to a computer-based network, said gateway further comprising a voice mail service which records messages;

at least one gatekeeper, including an address table for processing the calls between endpoints, wherein the gatekeeper routes calls to endpoints by accessing the address table for a corresponding address of said endpoint; and at least one voice mail intercept service terminal for the voice mail service, said voice mail intercept service terminal receives the incoming call from said switch under the direction of said gatekeeper and said voice mail intercept service terminal further connects the incoming call to said internet telephone of said called party so the called party can monitor the call.

2. A communication system according to claim 1 wherein such voice mail intercept service terminal is responsive to a take over signal from the called party to cause said voice mail intercept service terminal to establish a two-way communication connection between the incoming call and the called party.

3. A communication system according to claim 2 wherein said takeover signals further cause said voice mail system recording to cease.

4. A communication system according to claim 1 wherein the system further includes a gateway for processing calls from a public switched telephone network (PSTN) to a computer-based network, said switch being a part of said gateway.

5. A method for providing the ability to monitor a call being recorded onto a network-based voice mail system comprising the steps of:

interfacing a calling party on a first endpoint with:
 (a) an internet telephone switch;
 (b) a packet-based communication network having a voice mail service; and
 (b) a called party on a second endpoint, wherein said second endpoint comprises an internet telephone;

under preselected conditions, directing an incoming call to a voice mail service terminal based on address information in a gatekeeper; and establishing a connection from the voice mail service terminal to said second endpoint so as to allow the called party to monitor the message being recorded.

6. The method of recording to claim 5 further including the steps of allowing the called party to generate a take over signal; and establishing a two-way communication between the incoming call and the called party in response to the take over signal so that the called party can gain control of the all.

7. The method according to claim 6 wherein the method further comprises the step of deleting a recorded portion of a message.

8. A method for providing call connections and voice mail intercept capability wherein the method comprises the steps of:

establishing a control signal connection from a calling party through an internet telephone switch to a gatekeeper;

routing call control signals from said gatekeeper to a voice mail intercept system terminal;

establishing a voice data connection between said voice mail intercept system terminal and a called party having an internet telephone;

establishing a voice data connection between said voice mail intercept system terminal and said calling party; and receiving voice mail data from said calling party at said voice mail intercept system terminal and transmitting said voice mail data to both said voice mail service terminal and to said internet telephone of said called party so that said voice mail service terminal can record the voice data and said called party can monitor the voice mail data.

9. A method as claimed in claim 8 further including the steps of:

connecting said called party to said calling party for two-way communication with said calling party in response to a take over signal from said called party; and terminating said voice data connection between said voice mail intercept system terminal and said voice mail system terminal.

10. The method according to claim 8 wherein the method further comprises the additional step of having said voice mail service terminal terminate said call.

11. The method according to claim 8 wherein the method further comprises the step of deleting a recorded portion of a message from the voice mail system terminal.

* * * * *